United States Patent [19]
Coronado et al.

[11] Patent Number: 6,087,407
[45] Date of Patent: Jul. 11, 2000

[54] FLEXIBLE AEROGEL COMPOSITE FOR MECHANICAL STABILITY AND PROCESS OF FABRICATION

[75] Inventors: Paul R. Coronado; John F. Poco, both of Livermore, Calif.

[73] Assignee: The Regents of the University of California, Oakland, Calif.

[21] Appl. No.: 09/379,486

[22] Filed: Aug. 23, 1999

Related U.S. Application Data

[62] Division of application No. 09/017,035, Feb. 2, 1998.

[51] Int. Cl.[7] ........................................................ C08J 9/28
[52] U.S. Cl. ............................ 521/64; 521/181; 521/187; 521/188; 521/97
[58] Field of Search .............................. 521/64, 181, 187, 521/188

[56] References Cited

U.S. PATENT DOCUMENTS

| | | | |
|---|---|---|---|
| 4,873,218 | 10/1989 | Pekala | 521/181 |
| 4,997,804 | 3/1991 | Pekala | 521/181 |
| 5,086,085 | 2/1992 | Pekala | 521/187 |
| 5,476,878 | 12/1995 | Pekala | 521/61 |
| 5,494,940 | 2/1996 | Unger et al. | 521/66 |
| 5,556,892 | 9/1996 | Pekala | 521/181 |
| 5,738,801 | 4/1998 | Zeigler et al. | 524/493 |
| 5,744,510 | 4/1998 | Pekala | 521/181 |

*Primary Examiner*—Morton Foelak
*Attorney, Agent, or Firm*—Alan H. Thompson; L. E. Carnahan

[57] ABSTRACT

A flexible aerogel and process of fabrication. An aerogel solution is mixed with fibers in a mold and allowed to gel. The gel is then processed by supercritical extraction, or by air drying, to produce a flexible aerogel formed to the shape of the mold. The flexible aerogel has excellent thermal and acoustic properties, and can be utilized in numerous applications, such as for energy absorption, insulation (temperature and acoustic), to meet the contours of aircraft shapes, and where space is limited since an inch of aerogel is a 4–5 times better insulator than an inch of fiberglass. The flexible aerogel may be of an inorganic (silica) type or an organic (carbon) type, but containing fibers, such as glass or carbon fibers.

5 Claims, 1 Drawing Sheet

FLEXIBLE AEROGEL COMPOSITE FOR MECHANICAL STABILITY AND PROCESS OF FABRICATION

This Application is a division of application Ser. No. 09/017,035 filed Feb. 2, 1998.

The United States Government has rights in this invention pursuant to Contract No. W-7405-ENG48 between the United States Department of Energy and the University of California for the operation of Lawrence Livermore National Laboratory.

BACKGROUND OF THE INVENTION

The present invention relates to insulation material, particularly to aerogel type insulation, and more particularly to flexible aerogel composites for insulation (thermal and acoustic) and process of fabrication.

Insulators of various types have been developed for various application. For example, fiber glass, foamed organic polymers, and organic foam composites are well known and are used in the insulation, construction, and similar industries. These prior used foams, for example, generally are of relatively high density and were not suitable for many applications, such as high-energy physics applications, or as parts for inertial confinement fusion targets, which required very low densities.

In efforts to satisfy these needs, aerogels were developed. Aerogels are a unique class of ultra size, low density, open-cell foams. Aerogels have continuous porosity and a microstructure composed of interconnected colloidal-like particles or polymeric chains with characteristic diameters of 100 angstroms. The microstructure of aerogels is responsible for their unusual acoustic, mechanical, optical, and thermal properties. These microstructures impart high surface areas to the aerogels, for example, from about 350 m$^2$/g to about 1000 m$^2$/g. Their ultra fine cell/pore size minimizes light scattering in the visible spectrum, and thus, aerogels can be prepared as transparent, porous solids. Further, the high porosity of aerogels makes them excellent insulators with their thermal conductivity being about 100 times lower than that of the prior known fully dense matrix foams. Still further, the aerogel skeleton provides for the low sound velocities observed in aerogels.

Currently, aerogels of various compositions are known, and these aerogels were generally referred to as inorganic (such as silicon aerogels) and organic (such as carbon aerogels). Inorganic aerogels, for example, silica, alumina, or zirconia aerogels, are traditionally made via the hydrolysis and condensation of metal alkoxides, such as tetramethoxy silane. Organic aerogels, such as carbon aerogels, are typically made from the sol-gel polymerization of resorcinol or melamine with formaldehyde under alkaline conditions. The aerogels may be pyrolyzed following the gel drying or extraction process.

Each type of aerogel, inorganic or organic, involve the formation of a gel, and drying of the gel by either air drying or supercritical extraction. The final composition of the aerogel is determined by the processing of the gel, which may produce an xerogel, an aerogel, or a hybrid xerogel/aerogel. Following the drying operation of the organic gels, for example, the aerogel may be pyrolyzed to produce a carbon aerogel.

One means, known as supercritical extraction, for removing water from the water-based gel or aquagel to form an organic aerogel, for example, is by extraction of the gel with a relatively lower surface tension fluid, such as carbon dioxide. Because water is immiscible with liquid $CO_2$, the aquagels are first exchanged with an organic solvent such as acetone and then slowly dried inside a temperature-controlled pressure vessel. The critical point of carbon dioxide ($T_c$=31° C.; $P_c$=7.4 MPa) is low enough to facilitate its removal without degrading the gel structure. The time required for supercritical drying depends on the thickness of the gel. Traditional aerogels are not flexible.

Both the inorganic and organic aerogels have common and unique characteristics, and these characteristics often limit the effectiveness of that type of aerogel for certain applications. While both types of aerogels may have similar cell/pore sizes, densities, and surface areas, they generally differ in atomic number (Z). For example, inorganic aerogels generally have a higher Z than organic aerogels, in that silicon has a Z of 14, aluminum has a Z of 13 and zirconium has a Z of 40, while organic aerogels, consisting mostly of carbon having a Z of 6, hydrogen a Z of 1 with some oxygen having a Z of 8. Both types (inorganic and organic) as very effective as insulators, as pointed out above, for both thermal and/or acoustic applications. However, since traditional aerogels are not flexible, they have been less effective in applications in aircraft, ice boxes, or refrigeration, or for use as energy absorbers, etc. The present invention provides a flexible aerogel fabrication process.

SUMMARY OF THE INVENTION

It is an object of the present invention to provide a flexible aerogel having mechanical stability.

A further object of the invention is to provide a process for producing a flexible aerogel.

Another object of the invention is to provide an aerogel composite molded during fabrication to enable use in various contours or shapes.

Another object of the invention is to provide a composite aerogel, either inorganic or organic, which is flexible.

Another object of the invention is to provide a flexible composite aerogel for use in insulation (thermal and acoustic) and energy absorber applications.

Another object of the invention is to provide a process for producing flexible composite aerogels wherein fibers, such as glass or carbon fibers, are mixed in a mold with an aerogel solution, either inorganic or organic, allowing the mixture in the mold to gel, and processing the gel by supercritical or non-supercritical extraction, whereby a flexible aerogel is produced, and whereafter the flexible aerogel may be pyrolyzed if desired.

Other objects and advantages of the present invention will become apparent from the following description and accompanying drawings. Basically, the invention involves a flexible composite aerogel and process of fabrication. The flexible composite aerogel may be either an inorganic or organic aerogel, and is particularly adapted for use such as an insulator in contoured areas of an aircraft or other shapes requiring flexibility of the insulation. Since the flexible composite aerogel of this invention has both thermal and acoustic insulation properties, it has wide insulation applications as well as energy absorber applications. The fabrication process basically involves adding fibers, such as glass or carbon fibers, to a mold containing an aerogel solution, and processing the aerogel solution as known in the art, which processing may include supercritical or non-supercritical drying, whereby a flexible aerogel in the shape of the mold is produced.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The present invention is directed to a flexible composite aerogel having mechanical stability and to a process for fabricating same. The flexible aerogel of this invention may be of an inorganic or organic type. The aerogel is reinforced with fibers, such as glass or carbon fibers, and has excellent thermal and acoustic properties. Traditional aerogels are not flexible.

As pointed out above, an inch of aerogel is 4–5 times more effective as an insulator than an inch of fiberglass. Also, due to their small pores they are also excellent at dampening acoustical input. In aviation and space, for example, an increase in thermal insulation is difficult due to the limited space and the insulation must be flexible to meet the contours of aircraft or spacecraft shapes. By making a composite of aerogels and fibers, flexible aerogels can be produced, and such flexible composite aerogels can be formed in various shaped molds whereby the needed contour or shaped insulation may be provided.

The process for producing the flexible composite aerogels involves two modifications of the traditional aerogel fabrication process; namely, adding fibers to the aerogel solution, and processing the solution/fibers in a mold of a desired contour or shape. Basically, the process of fabricating the flexible composite aerogel is carried out by: providing a mold of a desired shape, which can be metal, glass or a variety of plastics; filling the mold with a desired quantity of fibers, which can be composed of glass, carbon, plastic, boron, aramid, or other material; preparing an aerogel solution, either organic or inorganic, pouring the aerogel solution into the mold so as to cover the fibers and fill the mold to a desired location, allowing the solution to gel, and processing the gel using supercritical or non-supercritical extraction. The gel must be removed from the mold if not compatible with the supercritical extraction (SCE) process, otherwise the gel is processed in the mold. Following the SCE process, which can be done in as little as two hours, depending on the thickness and composition of the gel, the flexible composite aerogel is removed from the mold and ready for use. As pointed out above, and as known in the art, processing of the gel using a non-supercritical extraction technique generally results in the formation of a different pore/cell structure and possibly a different final configuration, than when using an SCE process. Thus, SCE processing of the gel is preferred for high efficiency insulator applications, particularly where both thermal and acoustic insulation, or energy absorber utilization is desired.

Figure 1:
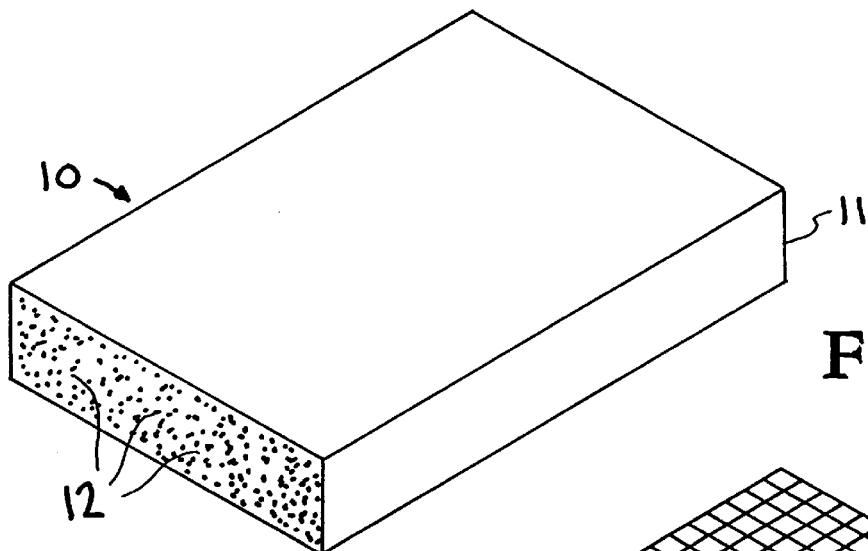
FIG. 1 is a view of a flexible composite aerogel matrix of the invention.

FIG. 1 illustrates an embodiment of a flexible composite aerogel matrix made in accordance with the invention, and may be of either the organic type (such as carbon), or inorganic type (such as silica). The composite aerogel matrix generally indicated at 10 is composed of a porous aerogel material 11 and fibers 12, the fibers 12 in this embodiment run lengthwise and are intermixed throughout the aerogel material 11 to provide flexibility and mechanical stability to the aerogel material. The composite aerogel matrix 10 may be formed in various shapes having a cross-section of 5 microns to ¼ inch and thicknesses ranging from 0.001" to 6.0". Depending on the application the fibers 12 can extend in different directions to provide the desired flexibility.

As pointed out above, fabrication of both organic and inorganic aerogels are well known, and thus the details of each fabrication process need not be set forth herein to enable those skilled in this field to carry out the process. Also, it is recognized that the processing differs to a certain degree depending on the composition of the initial aerogel solution. Since, the present invention primarily involves adding fibers to an aerogel solution and processing the solution in a mold specific details of the process are deemed unnecessary in view of the current state of the aerogel fabrication technology.

Figure 2:
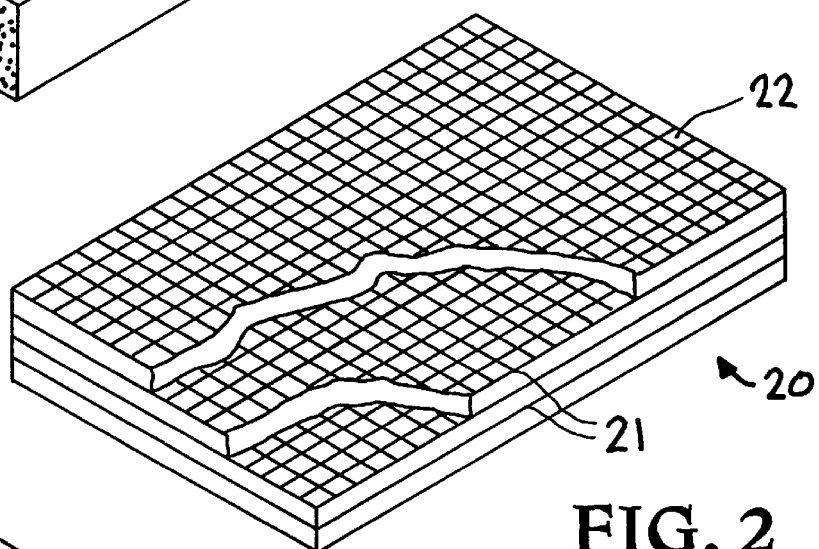
FIG. 2 illustrates a flexible composite aerogel matrix composed of layers of woven mat.

FIG. 2 illustrates an embodiment of a flexible composite aerogel matrix composed of layers of reinforced and flexible aerogel materials, either organic or inorganic. As shown in FIG. 2, the composite aerogel matrix generally indicated at 20 is composed of a plurality of layers 21 of a woven mat 22. In this embodiment the woven mat 22 is composed of transverse fibers embedded in an aerogel material. However, the woven mat 22 may be composed of fibers having different orientations, so as to provide the desired flexibility. While four (4) layers 21 of woven mat 22 have been shown, the aerogel matrix 20 may be composed of any desired number of layers 21.

Figure 3:
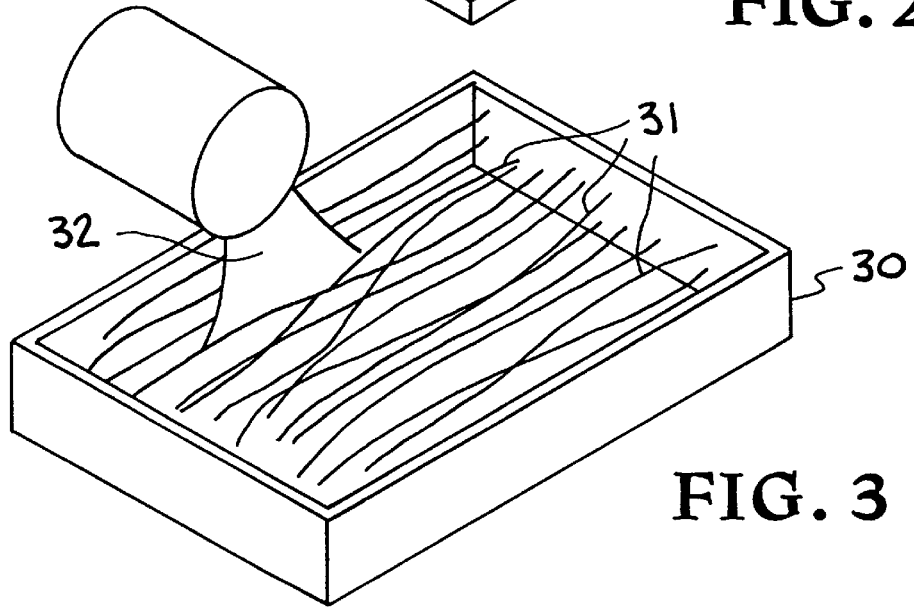
FIG. 3 illustrates a fabrication process for producing a flexible composite aerogel matrix, such as the FIG. 1 embodiment.

The basic process or method for fabricating the flexible composite aerogel matrix of FIG. 1 is illustrated in FIG. 3, which involves a mold 30 within which fibers 31 are located and into which an aerogel precursor 32 (either inorganic or organic) is poured so as to cover the fibers 31 and fill the mold 30 to a desired location, which determines the thickness of the aerogel matrix layer. Thereafter, allowing the solution to gel, and processing the gel using supercritical or non-supercritical extraction, as known in the aerogel fabrication technology which includes high temperature supercritical fluid extraction, liquid $CO_2$ exchange followed by $CO_2$ supercritical extraction or exchange of $H_2O$ with organic solvent followed by either extraction techniques. Following the extraction process, the aerogel matrix is removed from the mold and is ready for use. Should it be desired to carbonize the aerogel matrix, such can be done using existing techniques. As pointed out above, depending on the composition of the mold, the gel may need to be removed from the mold, prior to the extraction process.

It has thus been shown that the present invention involves a mechanically stable, flexible composite aerogel. The composite aerogel can be effectively utilized for insulation (thermal and acoustical), and can also be used as an energy absorber. The composite aerogel is fabricated in a mold and thus can be formed in any contour or shape, such as required for aircraft or space applications. The composite aerogel can be fabricated in various thicknesses and the quantity and type of fibers therein can be varied in accordance with the needs of specific applications. The flexible composite aerogel may be formed from either organic or inorganic aerogel solutions, mixed in a mold with various fibers (glass, carbon, etc.), and the mixture is allowed to gel, whereafter the gel is processed by either supercritical or non-supercritical extraction to produce the desired end products, a flexible composite aerogel that is mechanically stable. The formation of the composite aerogel in a mold enables the end product to be of any desired contour or shape while providing flexibility and excellent insulation properties.

While particular embodiments and specific fabrication processing, along with materials, parameters, etc., have been described and/or illustrated to exemplify and teach the principles of the invention, such are not intended to be limiting. Modifications and changes may become apparent to those skilled in the art, and it is intended that the invention be limited only by the scope of the appended claims.

The invention claimed is:

1. A process for producing flexible, mechanically stable organic polymer condensate containing formaldehyde composite aerogels, said aerogels containing intermixed fibers selected from the group consisting of glass, carbon, plastic, boron and aramid fibers, including:

providing a mold with a mixture of an aerogel solution and a quantity of fibers;

processing the mixture to form a gel; and extracting fluid from the gel.

2. The process of claim 1, wherein extracting fluid from the gel is carried out by supercritical extraction, whereafter the aerogel is removed from the mold.

3. The process of claim 1, wherein extracting fluid from the gel is carried out by supercritical extraction prior to removal from the mold or by removing the gel from the mold and then extracting fluid from the gel.

4. The process of claim 1, wherein extracting fluid from the gel is carried out by supercritical extraction by one of the group consisting of high temperature supercritical fluid extraction, liquid $CO_2$ exchange followed by $CO_2$ supercritical extraction, and exchange of $H_2O$ with organic solvent followed by either high temperature supercritical fluid extraction, or liquid $CO_2$ exchange followed by $CO_2$ supercritical extraction.

5. The process of claim 1, additionally including providing the quantity of fibers from intermitted fibers of different compositions.

* * * * *